United States Patent
Okeson et al.

(10) Patent No.: US 6,463,058 B1
(45) Date of Patent: Oct. 8, 2002

(54) METHOD FOR OPTIMALLY SELECTING NODES FOR REMOVAL FROM A HIERARCHICAL COMMUNICATION NETWORK

(75) Inventors: Victoria L. C. Okeson, Arvada; Pierre L. Bastien, Castle Rock, both of CO (US); Steve Y. Chiu, Bedford, MA (US); Youngho Lee, Seoul (KR)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/143,472

(22) Filed: Aug. 28, 1998

(51) Int. Cl.[7] .......................... H04L 12/28; H04L 12/50; H04M 7/00; G06F 15/177

(52) U.S. Cl. ................... 370/385; 370/386; 370/385; 370/254; 370/406; 370/410; 379/221.1; 709/220; 709/241

(58) Field of Search ................................. 370/385, 256, 370/384, 386, 422, 426, 496, 238, 254, 400, 406, 407, 408, 410; 379/221.08, 221.12, 221.1; 709/241, 220

(56) References Cited

U.S. PATENT DOCUMENTS 5,915,008 A * 6/1999 Dulman ....................... 379/201
5,949,872 A * 9/1999 Khalil et al. ................. 379/230
5,953,399 A * 9/1999 Farris et al. ................. 379/201
6,167,129 A * 12/2000 Fikis et al. .................. 379/230

OTHER PUBLICATIONS

Slides from INFORMS Conference, San Diego, CA (May 1997).

* cited by examiner

Primary Examiner—Alpus H. Hsu
Assistant Examiner—Toan D. Nguyen
(74) Attorney, Agent, or Firm—Townsend and Townsend Crew LLP

(57) ABSTRACT

Local signal transfer points (LSTPs) are optimally selected for removal from a Signaling System Number 7 (SS7) network. At least one network element is connected to each LSTP and each LSTP is connected to a parent node. Each LSTP is determined as a flexible LSTP or a fixed LSTP. A potential network configuration is formed with at least one flexible LSTP excluded. Each network element is reconnected to one LSTP in the potential network configuration and each LSTP in the potential network configuration is reconnected to one parent node. A total cost based on the potential network configuration is determined. The potential network configuration becomes the new best network configuration if the total cost is less than any previous total cost. The process is repeated for each potential network configuration resulting from removing a different combination of flexible LSTPs.

11 Claims, 3 Drawing Sheets

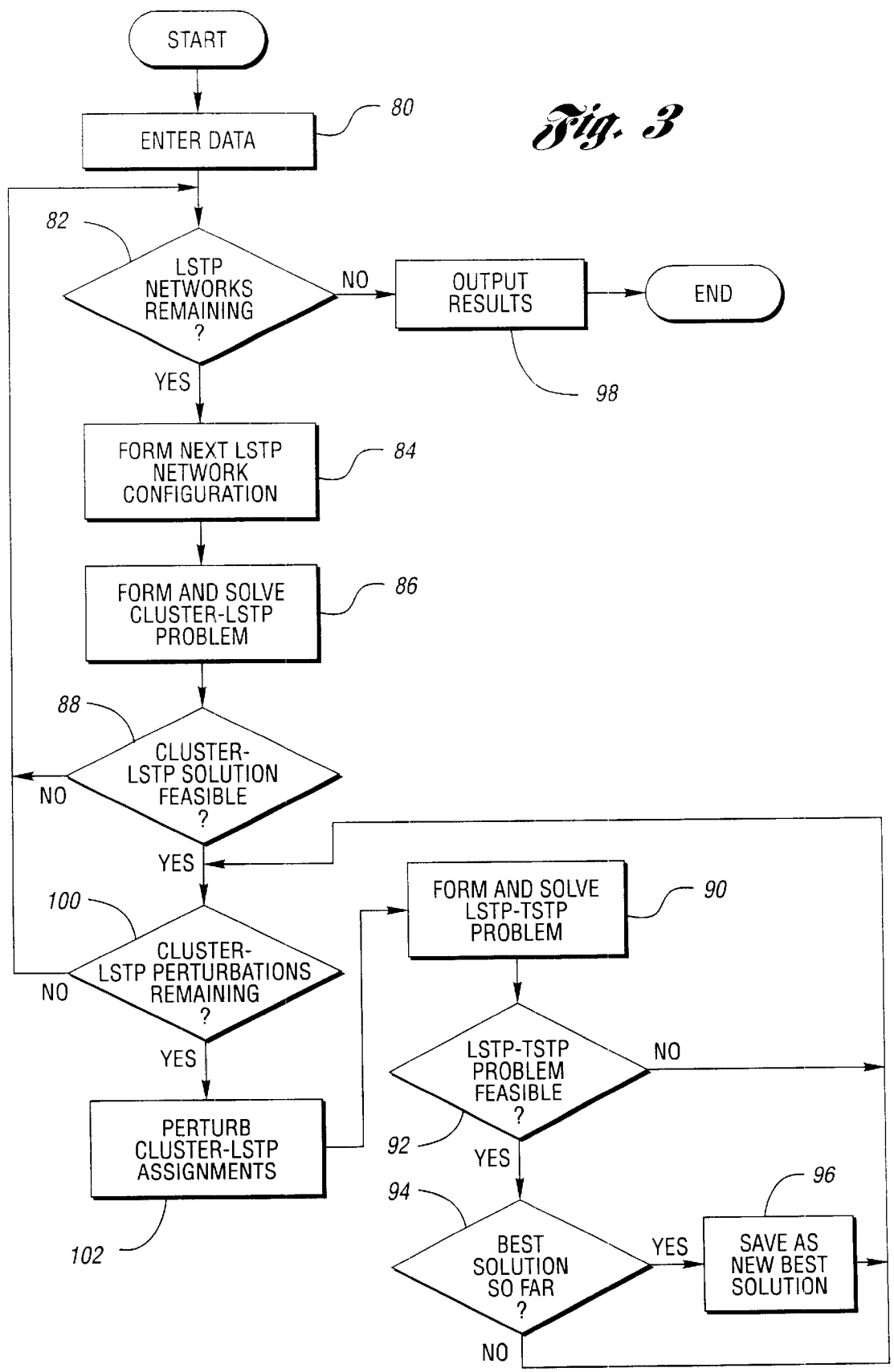

METHOD FOR OPTIMALLY SELECTING NODES FOR REMOVAL FROM A HIERARCHICAL COMMUNICATION NETWORK

TECHNICAL FIELD

This invention relates to methods for designing communication networks.

BACKGROUND ART

Communication networks may be arranged in a hierarchical or tree-like architecture. Nodes at each level of the hierarchy may communicate with other nodes at the same level, nodes at the next lower level, or nodes at the next higher level of the hierarchy. In order to optimize an existing network, to assist in planning network expansion, or to design a new network, it may be necessary to remove a node to minimize the network cost.

One such hierarchical network is the Signaling System Number 7 (SS7) network. An SS7 network is a packet data network used for out-of-band signaling to perform call set-up and tear-down, to implement Advanced Intelligent Network (AIN) services, to route traffic to interexchange carriers (IXCs), and to access database information needed to provide certain services such as 800, CLASS, and LIDB. The core of the SS7 network consists of switches called Signal Transfer Points (STPs). The STPs are interconnected with data links. Several different switch models may be used as STPS.

Each model has different capacity and engineering parameters.

An SS7 network can be built as a three-tiered hierarchical architecture. At the first level of the hierarchy, nodes are implemented as local STPs (LSTPs). These nodes serve local access transport areas (LATAs) providing service to network elements such as switching points (SSPs or central offices) in the LATA, Service Control Points (SCPs), and points of presence (POPs) for IXCs.

At the second level of the SS7 hierarchy, territorial STPs (TSTPs) serve to interconnect the LSTPs in their territory, SCPs, and other TSTPs. TSTPs may also service SSPs, SCPs, and POPs within a LATA.

At the third level of the SS7 network hierarchy, regional STPs (RSTPs) serve to interconnect TSTPs within their region and SCPs.

What is needed is a method to select a node for removal and to reconnect the elements of the network serviced by the node without adversely affecting the performance of the network as expressed by a set of constraints. In particular, for the three-tiered SS7 hierarchical network, LSTPs should be selected for retirement and elements connected to the LSTP should be rehomed to other LSTPs. The remaining LSTPs may further be homed to different TSTPs.

SUMMARY OF THE INVENTION

It is an object of the present invention to select nodes for removal from a hierarchical communications network.

Another object of the present invention is to determine the reconnection of elements in a hierarchical communications network once a node has been removed.

Still another object of the present invention is to reduce the cost of an SS7 network by selecting LSTPs for removal without adversely affecting the performance of the network as expressed by a set of constraints.

A further object of the present invention is to reconnect terminal nodes originally connected to excluded LSTPs to LSTPs remaining in the network configuration.

A still further object of the present invention is to rehome remaining LSTPs to TSTPs after removal of at least one LSTP.

Yet a further object of the present invention is to reduce the cost of an SS7 network subject to a set of constraints.

In carrying out the above objects and other objects and features of the present invention, a method is provided for optimally selecting LSTPs for removal from an SS7 network. The network has at least one network element connected to each LSTP and each LSTP is connected to a parent node. The method includes determining each LSTP as a flexible LSTP or a fixed LSTP. A potential network configuration is formed with at least one flexible LSTP excluded from the potential network configuration. Each network element is reconnected to one LSTP in the potential network configuration, and each LSTP in the potential network configuration is reconnected to one parent node. A total cost is determined based on the potential network configuration. The best network configuration is then determined as the potential network configuration if the total cost is less than the total cost of any previous potential network configuration. For each potential network configuration resulting from removing a different combination of flexible LSTPs, forming a potential network configuration, reconnecting each network element, reconnecting each LSTP, determining a total cost, and determining the best network configuration are repeated.

In one embodiment, each parent node is a TSTP. In another embodiment, each network element is a cluster, each cluster may be all POPs connected to one LSTP, all databases connected to one LSTP, or at least one SSP connected to one LSTP.

In yet another embodiment, reconnecting each network element to one LSTP in the potential network configuration comprises determining to which LSTP in the potential network each cluster should be connected based on costs of links between network elements and LSTPs in the potential network configuration, on costs of LSTPs in the potential network configuration, and on salvage costs of LSTPs excluded from the potential network configuration subject to a set of constraints. Similarly, reconnecting each LSTP in the potential network configuration to one parent node comprises determining to which parent node each LSTP in the potential network should be connected based on minimizing the costs of links between LSTPs in the potential network configuration and parent nodes and on costs of switches in parent nodes subject to a set of constraints. In a further embodiment, the total cost is the sum of LSTP-to-network component costs and the LSTP-to-TSTP costs.

In yet a further embodiment, the method includes abandoning the potential network configuration as a possible best network configuration if reconnecting each network element connected to an excluded flexible LSTP to an LSTP in the potential network configuration results in an infeasible solution or if reconnecting each LSTP in the potential network configuration to an parent node results in an infeasible solution.

In a still further embodiment, the method includes perturbing the connections of network elements to LSTPs in the potential network configuration by assigning at least one network element to a different LSTP in the potential network configuration and repeatedly perturbing the connections until a representative sample of feasible assignments in the solution space has been examined.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 3 is a flow diagram of an alternative embodiment of the present invention including perturbation.

BEST MODE FOR CARRYING OUT THE INVENTION

Figure 1:
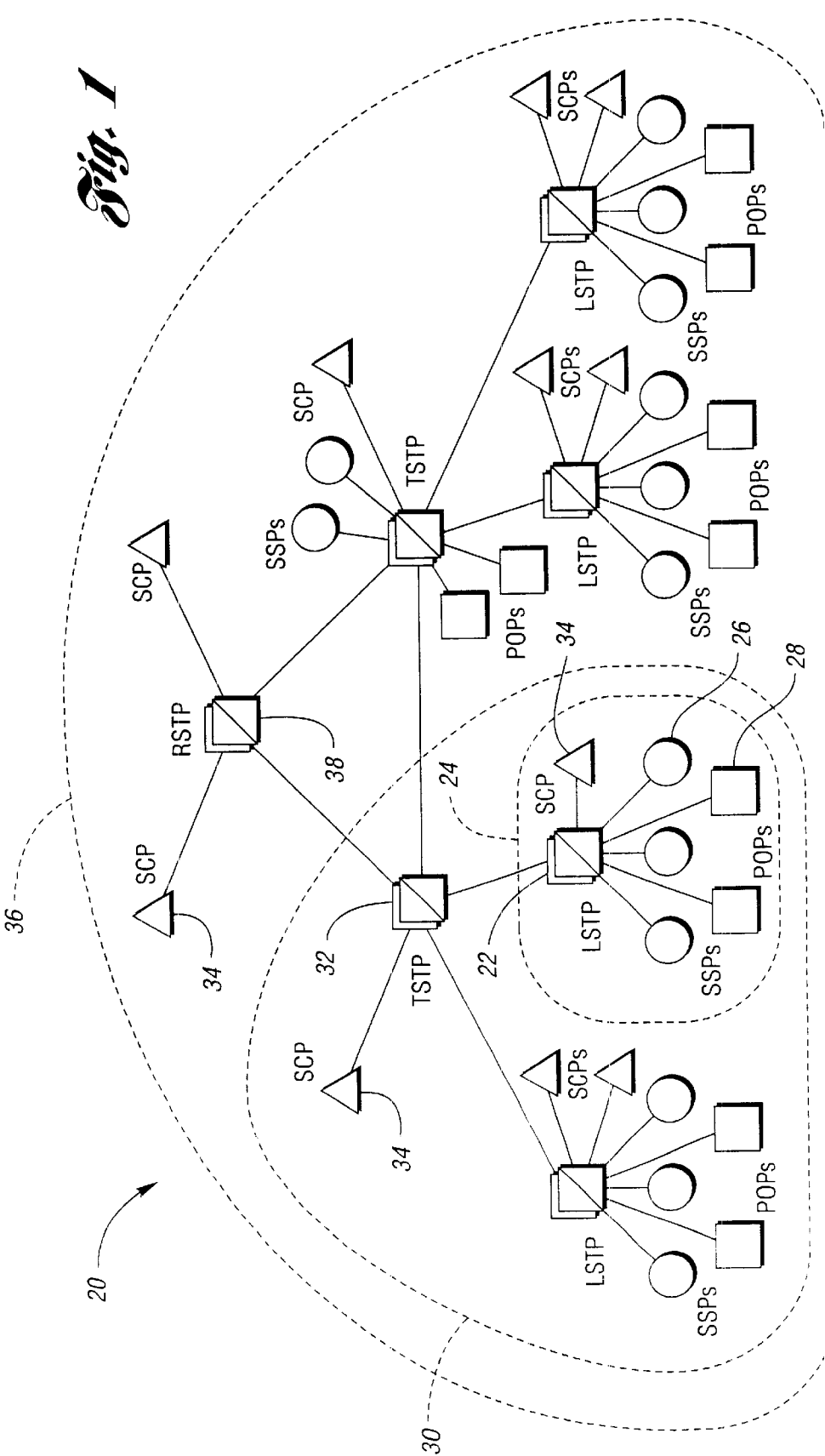
FIG. 1 is a block diagram of a three-tiered hierarchical SS7 network architecture that may be optimized by the present invention.

Referring now to FIG. 1, a three-tiered hierarchical SS7 network architecture is shown. An SS7 network, shown generally by 20, is comprised of three tiers. In the first tier, LSTP 22 serves LATA 24. Every SSP 26 in LATA 24 is connected either directly or indirectly to LSTP 22. Each LSTP 22 handles inter-LATA traffic to and from the IXCs via POPs, one of which is indicated by 28, attached to each LSTP 22. POPs 28 provide long distance services to regional Bell operating companies (RBOCs), which would otherwise be prohibited from transporting calls across the boundaries of LATA 24. Each LSTP may also service one or more SCPs, one of which is shown as 34.

Each LATA 24 belongs to a region, one of which is indicated by 30. Each LATA 24 within region 30 may be connected to one or more TSTP 32. Each TSTP 32 may be linked to a corresponding SCP 34. TSTP 32 may also service SSPs 26 and POPs 28 within a LATA 24.

Each TSTP 32 in region 36 is connected to RSTP 38. RSTP 38 also provides access to one or more SCP 34.

The optimization problem focuses on selecting the LSTPs 22 for retirement, rehoming terminal nodes such as SSPs 26, POPs 28, and SCPs 34 assigned to the retired LSTPs 22, and homing the remaining LSTPs 22 to TSTPs 32.

Figure 2:
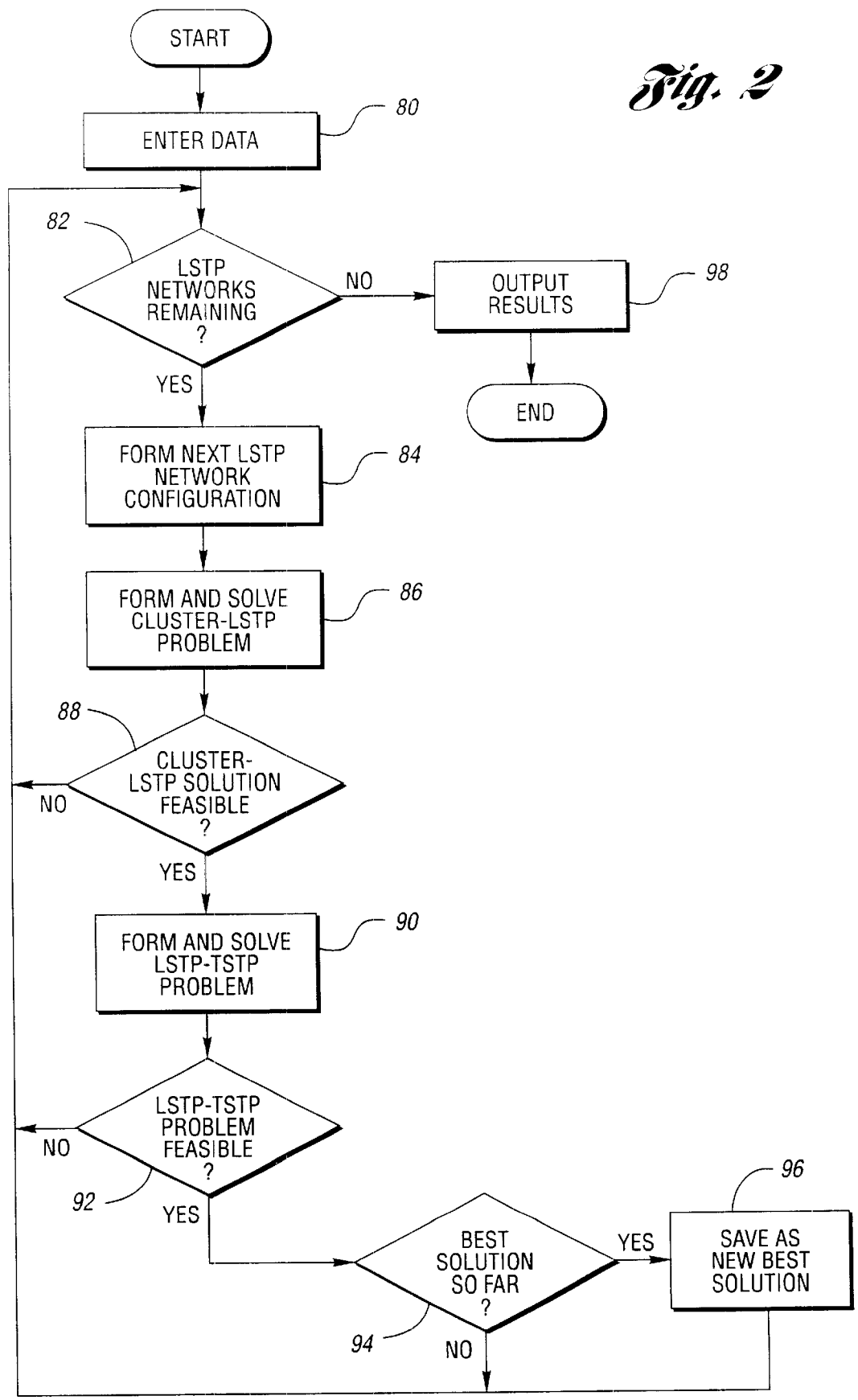
FIG. 2 is a flow diagram of an embodiment of the present invention.

FIGS. 2 and 3 show a flow diagrams illustrating operation of embodiments of the present invention. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Referring now to FIG. 2, a flow diagram of an embodiment of the present invention is shown. Data is entered in block 80. The current network configuration, engineering restrictions such as switch model and link capacity, and predicted traffic loads are entered. Any valid network obtained by the present method will be able to carry the predicted traffic while satisfying the engineering restrictions.

At least one LSTP 22 must be designated as flexible. Flexible LSTPs are candidate nodes for elimination from the communication network. Any LSTP 22 not designated as flexible is considered fixed and must remain in the final network. In a preferred embodiment, all TSTPs 32 and RSTPs 38 are fixed.

A check is made to see if any LSTP network configurations that have not been considered still remain in block 82. Since the number of LSTPs 22 is relatively small, every potential network combination based on keeping or removing each flexible LSTP 22 is considered. If n is the number of flexible LSTPs, there are $2^n$ potential network configurations with each combination of flexible LSTPs 22 removed. If all LSTP network configurations have been considered, results are delivered. If a configuration has not been examined, the next potential network configuration is considered.

The next LSTP network is formed in block 84. Every combination of networks with each flexible LSTP 22 either in or out of the network is considered. The order in which these combinations are considered is not critical. Any technique which generates each possible combination only once is appropriate. For example, the network containing all flexible LSTPs 22 may be considered first. Next, each network formed by removing one flexible LSTP 22 may be considered. Then each network with each pair of flexible LSTPs removed 22 may be considered. This process continues until the network with all flexible LSTPs 22 removed is considered.

The cluster-LSTP problem is formed and solved in block 86. The cluster-LSTP problem is formed by considering Equation 1:

$$C_1 = \sum_{i \in M} \sum_{j \in N} a_{ij} x_{ij} + \sum_{j \in N} \sum_{s \in S} C_{js} z_{js} - \sum_{j \in N} \sum_{s \in S} g_{js}(1 - z_{js}) \quad (1)$$

where $C_1$, is the cost of the cluster-LSTP solution, M is the set of clusters in the network indexed by i and N is the set of LSTP nodes in the network indexed by j. The cost of a link from cluster i to LSTP j is $a_{ij}$. This includes the capital costs, installation costs, retirement costs, and yearly maintenance for new links, and only yearly maintenance and lease costs for existing links. The binary integer variable $x_{ij}$ is equal to one when cluster i is assigned to LSTP j, and is zero otherwise. S is the set of switch types indexed by s. The cost of installing a switch of type s at LSTP j is $c_{js}$. This cost includes capital costs, installation costs, retirement costs, and yearly maintenance costs for a new switch type, any only yearly maintenance costs for the existing switch type. The binary integer variable $z_{js}$ is equal to one when the switch type s is installed at LSTP j, and is zero otherwise. The salvage value for removing switch type s at LSTP j is $g_{js}$.

Solving the cluster-LSTP problem involves minimizing the cost $C_1$ in Equation 1 subject to a set of constraints. The first constraint requires that each cluster be assigned to one and only one LSTP 22. This is expressed in Equation 2:

$$\sum_{j \in N} x_{ij} = 1 \quad i \in M \quad (2)$$

The second constraint specifies that there is at most one switch installed at flexible LSTP 22. The second constraint is expressed as Equation 3:

$$\sum_{s \in S} z_{js} \leq 1 \quad j \in N_{Flex} \quad (3)$$

where $N_{Flex}$ is the set of flexible LSTP nodes.

The third constraint requires that exactly one switch is installed at fixed LSTP 22. The third constraint is expressed in Equation 4:

$$\sum_{s \in S} z_{js} = 1 \quad j \in N_{Fix} \qquad (4)$$

where $N_{Fix}$ is the set of fixed LSTP nodes.

The fourth constraint ensures that the capacity of a switch s at LSTP j is not exceeded. Constraint 4 is expressed in Equation 5:

$$\sum_{i \in M} \lambda_{ihs} x_{ij} \leq q_{js} z_{js} + B \sum_{\substack{r \in S \\ r \neq s}} z_{jr} \quad j \in N, \ h \in H, \ s \in S \qquad (5)$$

Where $\lambda_{ihs}$ is the traffic load from cluster i in peak hour h in seconds of processor time required on switch type s, $q_{js}$ is the capacity of switch type s at LSTP j, and B is a constant. B is a number just large enough to make the constraint vacuous if $z_{js}$ equals zero.

The fifth constraint forces a switch to be installed at each LSTP j that has clusters homed to it. The fifth constraint is shown as Equation 6:

$$x_{ij} \leq \sum_{s \in S} z_{js} \quad i \in M, \ j \in N \qquad (6)$$

When the result of Equation 1 is implemented, various configurations of flexible LSTPs are examined. To forcibly remove an LSTP j from the network, the sixth constraint is added to the formulation. The sixth constraint is shown as Equation 7:

$$\sum_{s \in S} z_{js} = 0 \quad \text{for all removed } LSTPs \ j \qquad (7)$$

Once the cluster-LSTP problem has been solved, it is checked for feasibility in block 88. A solution is not feasible if any constraint cannot be met. This may happen, for example, if the traffic load of SSPs 26, POPs 28, and SCPs 34 homed to LSTP 22 exceeds the capacity of LSTP 22. If the solution is not feasible, the check for remaining LSTP network configurations is repeated. If the solution is feasible, the LSTP-TSTP problem is formed and solved.

The LSTP-TSTP problem is formed and solved in block 90. The LSTP-TSTP problem is formed by considering Equation 8:

$$C_2 = \sum_{k \in P} \sum_{s \in S} c_{ks} t_{ks} + \sum_{j \in N} \sum_{k \in P} \sum_{l \in L} b_{jkl} v_{jkl} \qquad (8)$$

where $C_2$ is the cost of the LSTP-TSTP solution, P is the set of TSTP nodes in the network indexed by k and L is the set of link types indexed by l. The cost of installing a switch of type s at TSTP k is $c_{ks}$. This cost includes capital costs, installation costs, retirement costs, and yearly maintenance costs for a new switch type, and only yearly maintenance costs for the existing switch type. The binary variable $t_{ks}$ is equal to one when switch type s is installed at TSTP k and is zero otherwise. The cost of installing link type l from LSTP j to TSTP k is $b_{jkl}$. This includes the capital costs, installation costs, retirement costs, and yearly maintenance costs for new links and only yearly maintenance and lease costs for existing links. The binary variable Vjkl is equal to one when a link of type l is installed from LSTP j to TSTP k and is zero otherwise.

Solving the LSTP-TSTP problem involves minimizing the cost $C_2$ in Equation 8 subject to a set of constraints. The first constraint ensures that each LSTP homes to exactly one TSTP. The first constraint is expressed as Equation 9:

$$\sum_{k \in P} y_{jk} = 1 \quad j \in N \qquad (9)$$

where $y_{jk}$ is a binary variable equal to one when LSTP j is assigned to TSTP k and is zero otherwise.

The second constraint requires that exactly one switch is installed at each TSTP. The second constraint is expressed as Equation 10:

$$\sum_{s \in S} t_{ks} = 1 \quad k \in P \qquad (10)$$

The third constraint forces a link to exist between LSTP j and TSTP k if LSTP j homes to TSTP k. The third constraint is expressed as Equation 11.

$$y_{jk} \leq \sum_{l \in L} v_{jkl} \quad j \in N, \ k \in P \qquad (11)$$

The fourth constraint ensures that there is at most one link type installed between LSTP j and TSTP k. The fourth constraint is expressed as Equation 12:

$$\sum_{l \in L} v_{jkl} \leq 1 \quad j \in N, \ k \in P \qquad (12)$$

The fifth constraint ensures that the capacity of link i between LSTP j and TSTP k is not exceeded. The fifth constraint is expressed as Equation 13:

$$w_{jh} y_{jk} \leq \sum_{l \in L} r_l v_{jkl} \quad j \in N, \ k \in P, \ h \in H \qquad (13)$$

where $W_{jh}$ is the maximum link capacity in octets for LSTP j in hour h, r, is the capacity of link type l, P is the set of TSTP nodes in the network indexed by k, H is the set of peak hours indexed by h, and L is the set of link types indexed by l.

The sixth constraint ensures that the capacity of switch s at TSTP k is not exceeded. The sixth constraint is expressed by Equation 14:

$$\sum_{j \in N} u_{jhs} y_{jk} \leq q_{ks} t_{ks} + B \sum_{\substack{r \in S \\ r \neq s}} t_{kr} \quad k \in P, \ h \in H, \ s \in S \qquad (14)$$

where $U_{jhs}$ is the traffic load from LSTP j in peak hour h in seconds of processor time required on switch type s. $q_{ks}$ is the capacity of switch type s at TSTP k, and B is a constant. B is a number just large enough to make the constraint vacuous if $t_{ks}$ equals zero.

The feasibility of the LSTP-TSTP solution is determined in block 92. A solution is not feasible if any constraint cannot be met. If the solution is not feasible, a check for remaining LSTP network configurations is repeated. If the solution is feasible, the solution is compared to the best solution found so far.

The solution is compared to the best solution found so far in block 94. In the preferred embodiment, the quantitative measure of the solution is the sum of costs $C_1$ and $C_2$. Since minimizing both Equations 1 and 8 is desired, a smaller sum indicates a better solution. If the sum of the cluster-LSTP solution and the LSTP-TSTP solution is not better than the best solution found so far, the check for remaining LSTP network configurations is repeated. If the sum of the cluster-LSTP solution and the LSTP-TSTP solution is better than the best solution so far, the sum of the cluster-LSTP solution and the LSTP-TSTP solution is saved along with the network configuration as the new best solution in block 96.

Results are output in block 98. Once all potential network configurations resulting from removing a different combination of flexible LSTPs have been considered, results are delivered. Results include an optimized network architecture indicating which flexible LSTPs, if any, have been removed.

Referring now to FIG. 3, a flow diagram of an alternative embodiment of the present invention is shown. The embodiment shown in FIG. 3 is similar to the embodiment shown in FIG. 2 above with the addition that the cluster-LSTP solution is perturbed prior to forming and solving the LSTP-TSTP problem.

A check for remaining cluster-LSTP perturbations is made in block 100. Assignments of clusters to LSTPs 22 is altered. If an unexamined assignment pattern remains, the cluster-LSTP solution is perturbed. When all representative feasible assignments in a given cross section of the solution space have been examined, the perturbation loop is exited and a check for remaining network configurations is performed.

The cluster-LSTP solution is perturbed in block 102. A preferred perturbation method is heuristic search. A new assignment is proposed. Small transformations of this assignment are performed at each perturbation step with the goal of reducing the cost of the proposed network configuration.

For either the method described with regards to FIG. 2 or to FIG. 3 above, a preferred embodiment groups terminal nodes into clusters to reduce computational complexity. Each TSTP 32 and fixed LSTP 22 has one cluster that contains all SSPs 26, SCPs 34, and POPs 28 attached to TSTP 32 or fixed LSTP 22. Each flexible LSTP 22 has one or more clusters, one for POPs 28 attached to flexible LSTP 22, one for the SCPs 34, attached to flexible LSTP 22, and one or more clusters for SSPs attached to flexible LSTP 22. SSPs 26 are clustered according to a geographic attribute such as, for example, LATA, city, state, metropolitan statistical area, or numbering plan area, as specified by the user. If flexible LSTP 22 is retired, its clusters are rehomed to one or more other LSTPs 22. All of the cost, traffic, and demand information for the terminal node is aggregated to form the cost, traffic, and demand data for the clusters.

While the best modes for carrying out the invention have been described in detail, those familiar with the art to which this invention relates will recognize various alternative designs and embodiments for practicing the invention as defined by the following claims.

What is claimed is:

1. A method of selecting local signal transfer points (LSTPS) for removal from a Signaling System Number 7 (SS7) network wherein at least one network element is connected to each LSTP and wherein each LSTP is connected to a parent node, the method comprising:

determining each LSTP as a flexible LSTP or a fixed LSTP;

forming a potential network configuration with at least one flexible LSTP excluded from the potential network configuration;

reconnecting each network element to an LSTP in the potential network configuration;

reconnecting each LSTP in the potential network configuration to a parent node;

determining a total cost based on the potential network configuration;

determining a best network configuration as the potential network configuration if the total cost is less than the total cost of any previous potential network configuration; and repeating, for each potential network configuration resulting from removing a different at least one flexible LSTP, forming a potential network configuration, reconnecting each network element, reconnecting each LSTP, determining a total cost, and determining a best network configuration.

2. The method as in claim 1 wherein each parent node is a territorial signal transfer point (TSTP).

3. The method as in claim 1 wherein each network element is a cluster comprised of one of a set including all points-of-presence (POPs) connected to one LSTP, all service control points (SCPs) connected to one LSTP, and at least one service switching point (SSP) connected to one LSTP.

4. The method as in claim 3 wherein reconnecting each network element connected to one LSTP in the potential network configuration comprises determining to which LSTP in the potential network each cluster should be connected based on costs of links between network elements and LSTPs in the potential network configuration, on costs of LSTPs in the potential network configuration, and on salvage costs of LSTPs excluded from the potential network configuration subject to a set of constraints.

5. The method as in claim 1 wherein reconnecting each LSTP in the potential network configuration to one parent node comprises determining to which parent node each LSTP in the potential network should be connected based on minimizing the costs of links between LSTPs in the potential network configuration and parent nodes and on costs of switches in parent nodes subject to a set of constraints.

6. The method as in claim 1 wherein determining a total cost comprises:

determining a first cost based on costs of links between network elements and LSTPs in the potential network configuration, on costs of LSTPs in the potential network configuration, and on salvage costs of LSTPs excluded from the potential network configuration;

determining a second cost based on costs of links between LSTPs in the potential network configuration and parent nodes and on costs of switches in parent nodes; and determining the total cost as the sum of the first cost and the second cost.

7. The method as in claim 1 further comprising:

abandoning the potential network configuration as a possible best network configuration if reconnecting each network element to one LSTP in the potential network configuration results in an infeasible solution; and abandoning the potential network configuration as a possible best network configuration if reconnecting each LSTP in the potential network configuration to one parent node results in an infeasible solution.

8. The method as in claim 1 further comprising:

perturbing the connections of network elements to LSTPs in the potential network configuration by assigning at least one network element to a different LSTP in the potential network configuration; and repeating perturbing the connections until a representative sample of feasible assignments in the solution space has been examined.

9. A method of selecting local signal transfer points (LSTPS) for removal from a Signaling System Number 7 (SS7) network wherein at least one network element is connected to each LSTP and wherein each LSTP is connected to a parent node, the method comprising:

determining each LSTP as a flexible LSTP or a fixed LSTP;

forming a potential network configuration with at least one flexible LSTP excluded from the potential network configuration;

reconnecting each network element to an LSTP in the potential network configuration;

reconnecting each LSTP in the potential network configuration to a parent node;

determining a first cost based on costs of links between network elements and LSTPs in the potential network configuration, on costs of LSTPs in the potential network configuration, and on salvage costs of LSTPs excluded from the potential network configuration;

determining a second cost based on costs of links between LSTPs in the potential network configuration and parent nodes and on costs of switches in parent nodes;

determining a total cost as the sum of the first cost and the second cost;

determining a best network configuration as the potential network configuration if the total cost is less than the total cost of any previous potential network configuration; and repeating, for each potential network configuration resulting from removing a different at least one flexible LSTP, forming a potential network configuration, reconnecting each network element, reconnecting each LSTP, determining a total cost, and determining a best network configuration.

10. A method of selecting local signal transfer points (LSTPs) for removal from a Signaling System Number 7 (SS7) network wherein at least one network element is connected to each LSTP and wherein each LSTP is connected to a parent node, the method comprising:

determining each LSTP as a flexible LSTP or a fixed LSTP;

forming a potential network configuration with at least one flexible LSTP excluded from the potential network configuration;

reconnecting each network element to an LSTP in the potential network configuration;

reconnecting each LSTP in the potential network configuration to a parent node;

determining a total cost based on the potential network configuration;

determining a best network configuration as the potential network configuration if the total cost is less than the total cost of any previous potential network configuration;

abandoning the potential network configuration as a possible best network configuration if reconnecting each network element to one LSTP in the potential network configuration results in an infeasible solution;

abandoning the potential network configuration as a possible best network configuration if reconnecting each LSTP in the potential network configuration to a parent node results in an infeasible solution; and repeating, for each potential network configuration resulting from removing a different at least one flexible LSTP, forming a potential network configuration, reconnecting each network element, reconnecting each LSTP, determining a total cost, determining a best network configuration, and abandoning infeasible network configurations.

11. A method of selecting local signal transfer points (LSTPs) for removal from a Signaling System Number 7 (SS7) network wherein at least one network element is connected to each LSTP and wherein each LSTP is connected to a parent node, the method comprising:

determining each LSTP as a flexible LSTP or a fixed LSTP;

forming a potential network configuration with at least one flexible LSTP excluded from the potential network configuration;

reconnecting each network element to an LSTP in the potential network configuration;

perturbing the connections of network elements to LSTPs in the potential network configuration by assigning at least one network element to a different LSTP in the potential network configuration;

repeating perturbing the connections until a representative sample of feasible assignments in the solution space has been examined;

reconnecting each LSTP in the potential network configuration to a parent node;

determining a total cost based on the potential network configuration;

determining a best network configuration as the potential network configuration if the total cost is less than the total cost of any previous potential network configuration; and repeating, for each potential network configuration resulting from removing a different at least one flexible LSTP, forming a potential network configuration, reconnecting each network element, perturbing the connections, reconnecting each LSTP, determining a total cost, and determining a best network configuration.

* * * * *